United States Patent [19]

Madsen

[11] 4,152,611
[45] May 1, 1979

[54] ROTOR FOR ELECTRICAL DEVICE

[75] Inventor: Kristian D. Madsen, Vasteras, Sweden

[73] Assignee: ASEA Aktiebolag, Vasteras, Sweden

[21] Appl. No.: 751,867

[22] Filed: Dec. 17, 1976

[30] Foreign Application Priority Data

Dec. 17, 1975 [SE] Sweden ............................. 75142596

[51] Int. Cl.² .............................................. H02K 1/32
[52] U.S. Cl. ......................................... 310/61; 310/65
[58] Field of Search ...................... 310/52, 54, 57, 58, 310/59, 60, 61, 64, 65, 42, 43, 90, 214, 215, 194, 261, 264, 265; 290/1 B, 52

[56] References Cited
U.S. PATENT DOCUMENTS 4,010,393  3/1977  Lorch ..................................... 310/43

Primary Examiner—R. Skudy
Attorney, Agent, or Firm—Pollock, Vande Sande & Priddy

[57] ABSTRACT

This invention relates to a new and useful rotor assembly for an electrical device, such as a turbo-generator, and comprising; a core of magnetic material with at least one winding of a hollow conductor surrounding the core and rotatably supported by a pair of flanged end shafts, with a non-magnetic spacing piece positioned between the core and each of the flanged end shafts, and a prestressed cylindrical casing surrounding the core for retaining the coil winding in place against centrifugal force generated during operation of the rotor assembly.

25 Claims, 7 Drawing Figures

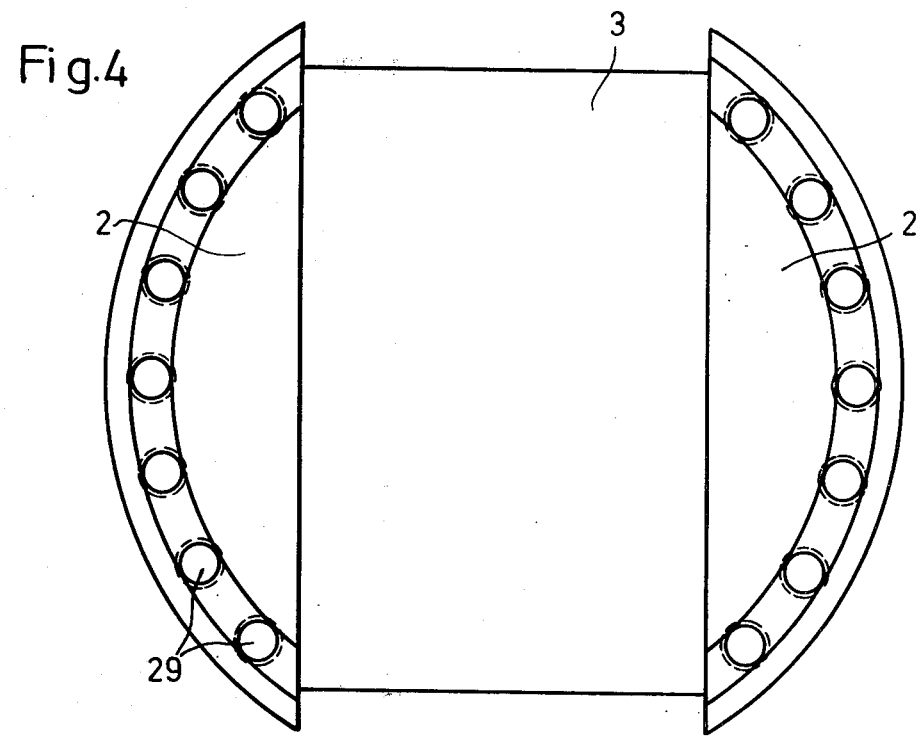
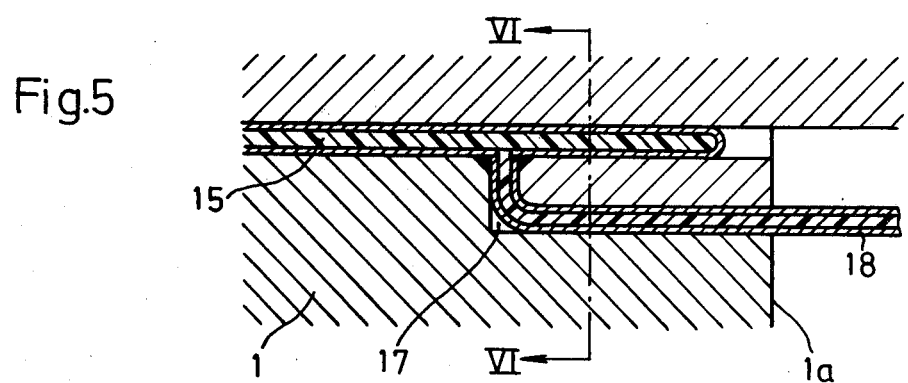
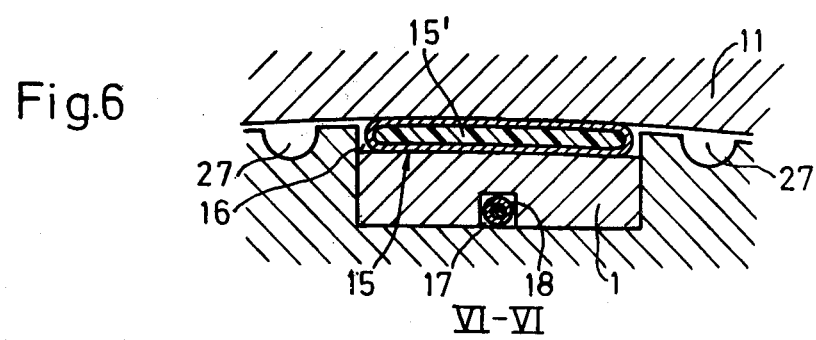

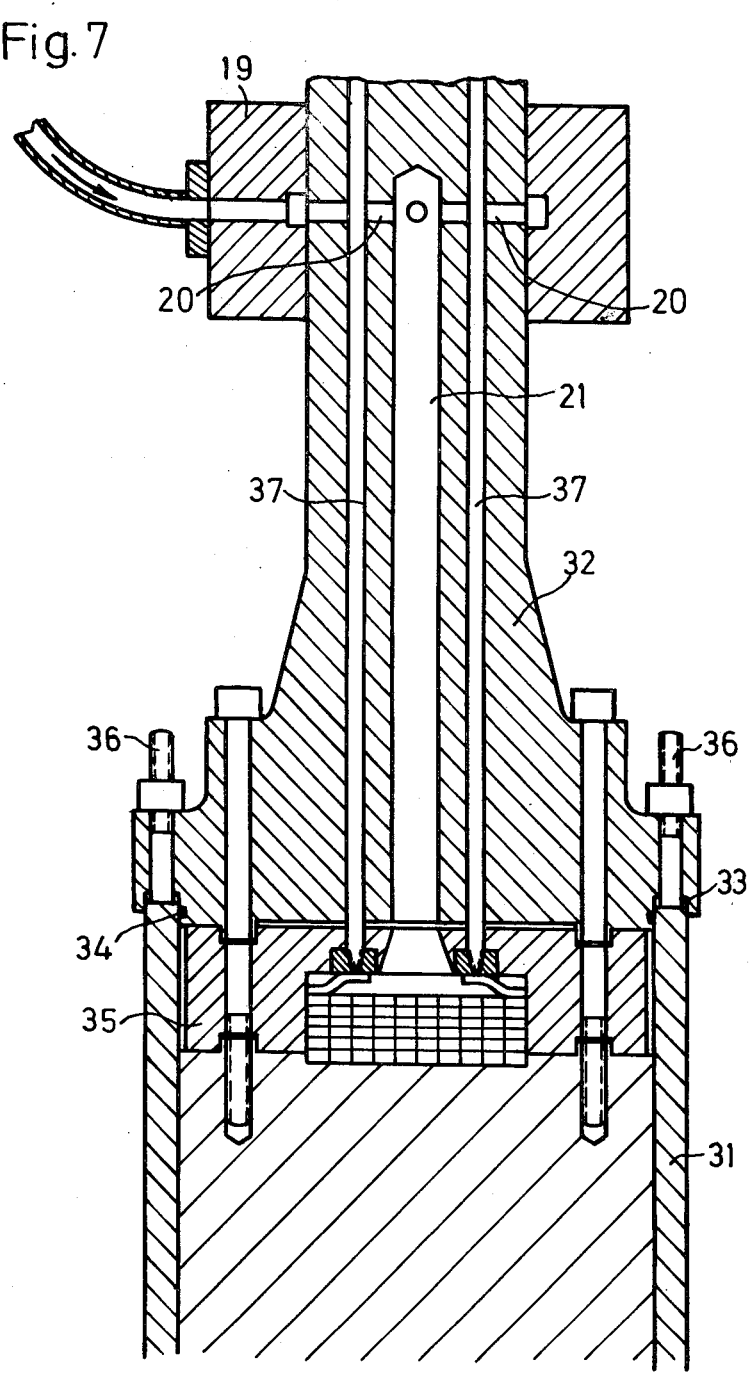

ROTOR FOR ELECTRICAL DEVICE

BACKGROUND OF THE INVENTION

Rotors for turbo-generators are known which comprise an iron core with two pole parts and an intermediate, substantially parallelepipedic portion surrounded by a plurality of winding turns which together form the excitation winding of the generator. Two shaft ends are flanged to one end each of the iron core with separate intermediate circular plates of non-magnetic material and a pre-stressed cylindrical metal casing is arranged to surround the whole iron core and exert a pressure against the air gap surface of said iron core, the pressure being evenly distributed at least in axial direction. A rotor of the above kind is described in German patent specification DBP No. 1,077,774.

OBJECTS OF THE INVENTION

An object of the invention is to provide an improved rotor having means for cooling the rotor windings and core.

A further object of the invention is to provide such a rotor which uses as a coolant the lubricating oil required for the rotor bearings.

Yet another object of the invention is to provide such a rotor in which cooling is provided by making minor modifications to components of known rotor designs, at modest increase in cost.

These objects are given only by way of example. Thus, other desirable objectives and advantages inherently achieved by my invention may occur to those skilled in the art. Nonetheless, the scope of the invention is to be limited only by the appended claims.

SUMMARY OF THE INVENTION

A rotor according to the invention is provided with a cooling system for direct cooling. Direct cooling has been achieved substantially by modifying somewhat various known constructional elements that also are necessary for other purposes. With a surprisingly small additional cost, the invention provides a machine with considerably greater power capabilities than similar prior art machines, with about the same amount of material.

More specifically, a rotor according to the invention comprises in one embodiment a core of magnetic material having an axis of rotation, with at least one winding on the core of hollow conductors. Means are provided for conveying coolant through one shaft end of the rotor, into the hollow conductors and out the other shaft end of the rotor. A cylindrical casing surrounds the rotor to prevent leakage of coolant. The casing is pre-stressed to maintain the windings in place in operation.

BRIEF DESCRIPTION OF THE DRAWING

The invention will be described with reference to the accompanying schematic drawings, in which:

FIG. 4 shows the magnetic core of the same rotor in an end view.

FIG. 5 shows in axial section one of several possible expansion devices for pre-stressing the casing of the rotor.

FIG. 6 shows a radial section along line VI—VI of FIG. 5.

FIG. 7 shows in axial section an embodiment of the invention which deviates from the one shown in FIGS. 1 to 6 substantially by the fact that the cylindrical winding casing of the rotor is arranged with its end portions in annular slots provided in the shaft ends instead of in a non-magnetic spacing piece, the casing being made of non-magnetic material.

DETAILED DESCRIPTION OF THE PREFERRED EMBODIMENTS

Figure 1:
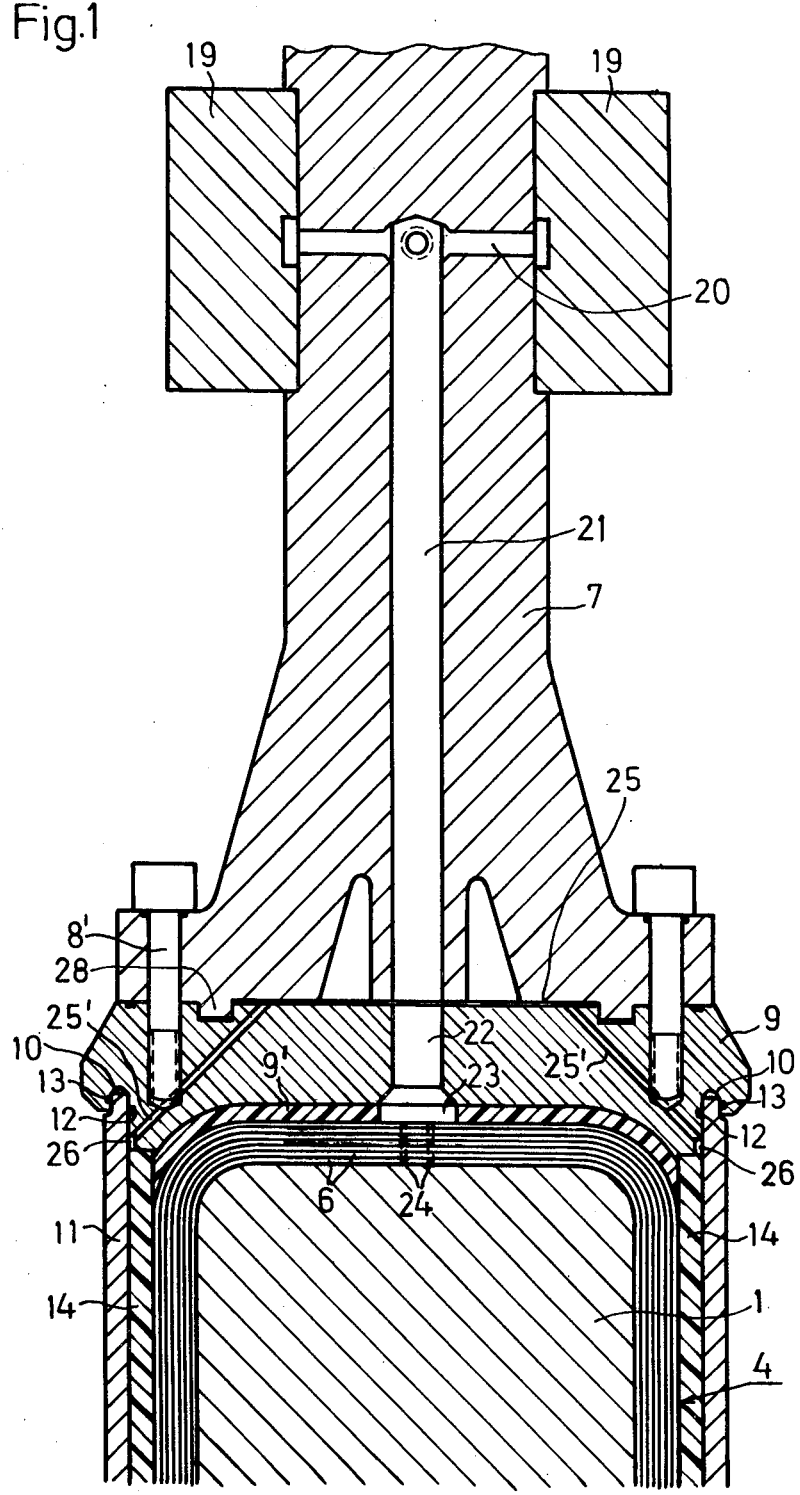
FIG. 1 shows an axial section through one rotor end along line I—I of FIG. 3.

There follows a detailed description of the preferred embodiments of the invention, reference being had to the drawing in which like reference numerals identify like elements of structure in each of the several Figures.

Figure 2:
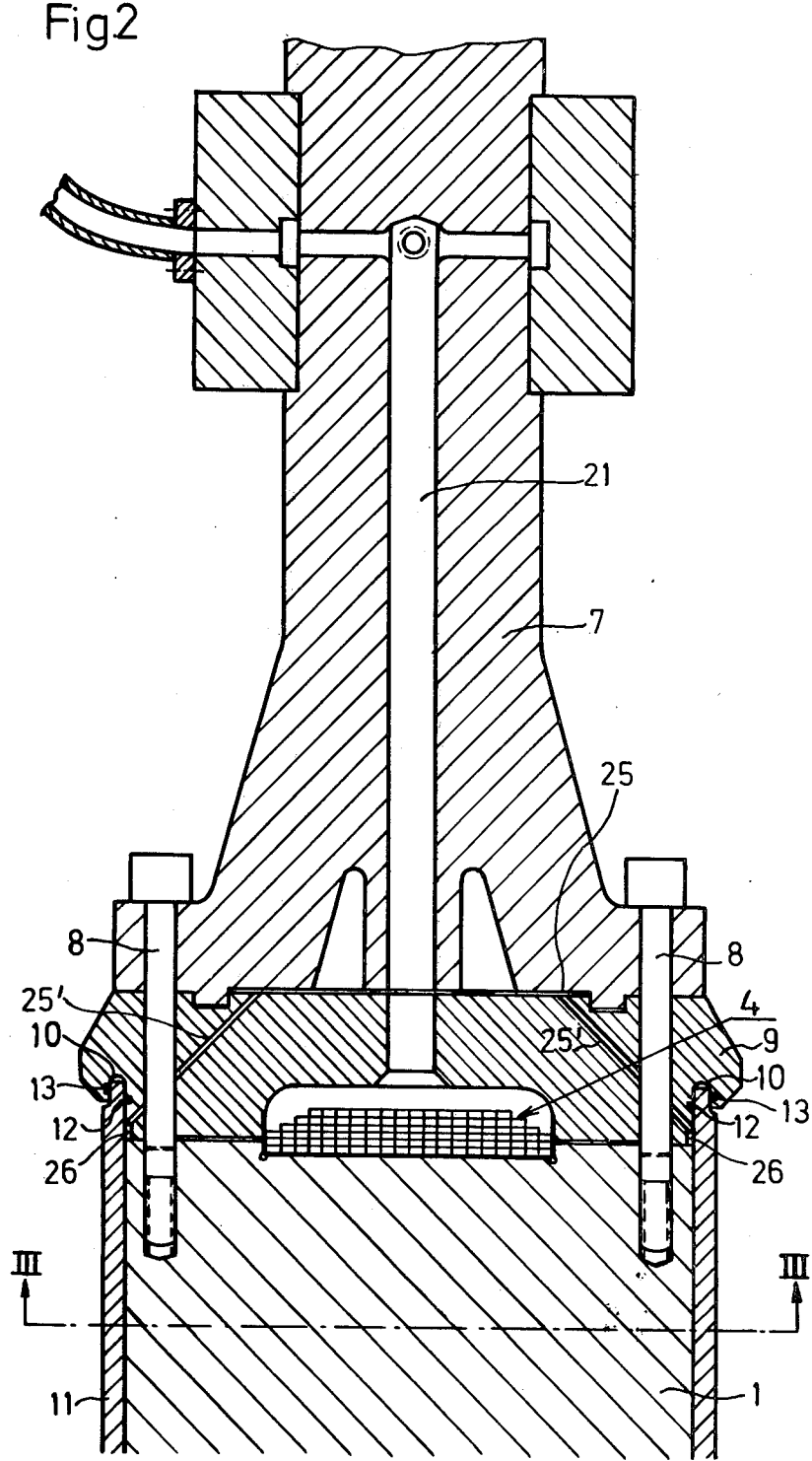
FIG. 2 shows an axial section through one end of a rotor along line II—II of FIG. 3. The corresponding sections through the other rotor end are reversely symmetrical in relation to those shown in FIGS. 1 and 2.
Figure 3:
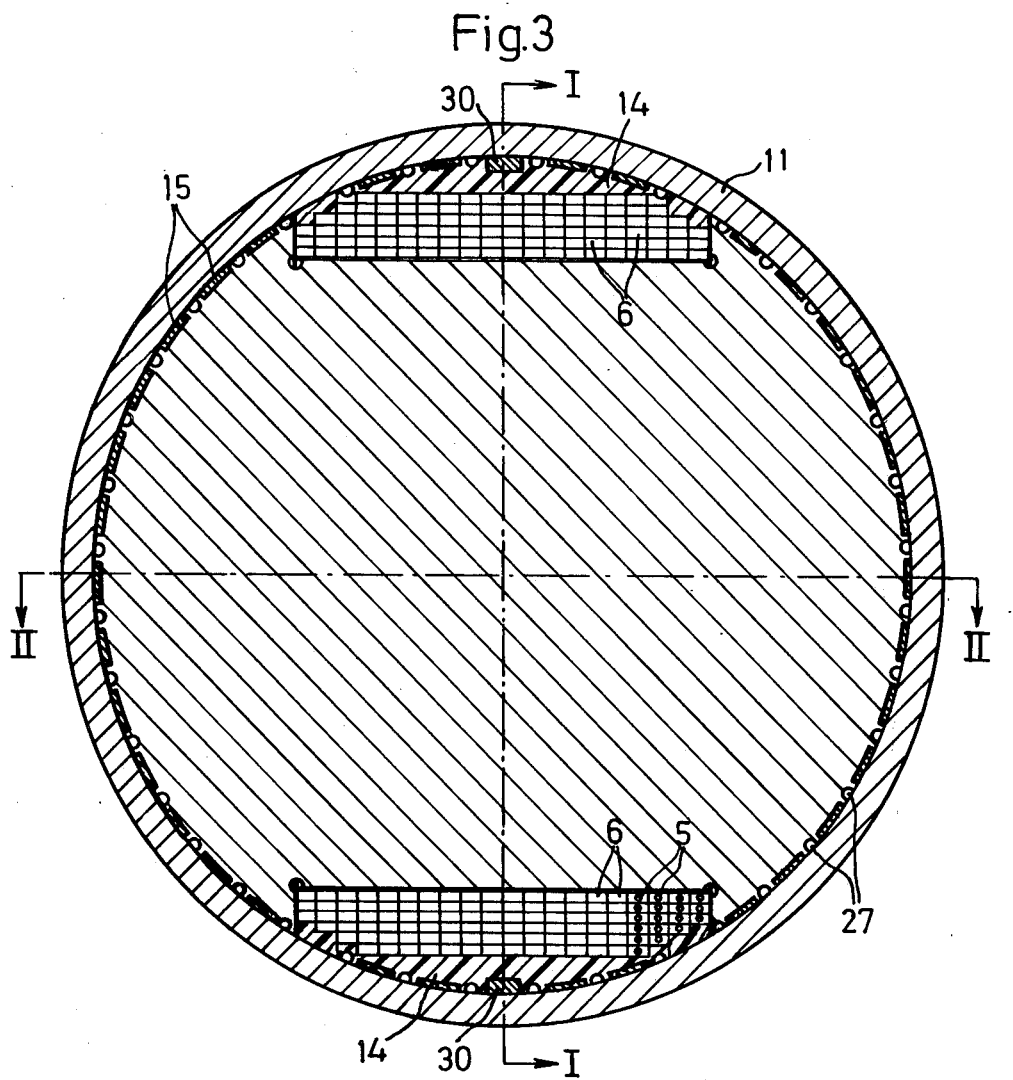
FIG. 3 shows a rotor according to the invention in section along III—III of FIG. 2.

In the drawings, a solid iron rotor core 1 is shown, having an axial dimension at least three times its diameter. Rotor core 1 comprises two pole parts 2 formed as segments of a circular cylinder and a parallelepipedic portion 3 lying between said pole parts 2, as shown in FIG. 4. Parallelepipedic portion 3 is surrounded by a coil 4 which constitutes the excitation winding of the generator. Coil 4 includes a plurality of turns of a hollow conductor 6 provided with longitudinal cooling channels 5, as shown in FIG. 3. Two shaft ends 7 are attached by flanging to one end each of the rotor body 1 by means of screw bolts 8 and 8' which are threaded into bores in a pair of circular spacing pieces 9 of non-magnetic material arranged between rotor core 1 and one shaft end and into bores in rotor core 1, respectively. See FIGS. 1 and 2. Each spacing piece 9 is provided with an axially inwardly facing, annular slot 10. Each of the two slots 10 contains an end of a cylindrical casing 11 which surrounds the rotor body and exerts a radially directed pressure against the rotor core 1 and against filling bodies 14 of non-magnetic material arranged radially outside coil 4. In each annular slot 10 there are two sealing rings 12 and 13 sealing against the inner side and the outer side, respectively, of the hollow cylinder 11. Thus cylinder 11 and spacing pieces 9 form a container which preferably is pressure-tight at an internal pressure of at least 10 bar.

In order to safely retain coil 4 against the great centrifugal forces which manifest themselves in operation, casing 11 preferably is mounted with such high pre-stress that the axially running parts of coil 4 will exert a considerable pressure against the iron surfaces of rotor core 1 lying radially inside, at maximum operating speed. When the rotor is stationary, the tensile stress in casing 11 should be at least 30% of the yield point of the cylinder material. Such high pre-stressing is achieved in the invention by means of a plurality of expansion devices 15 which preferably have the same length as the rotor core, as shown in FIGS. 3, 5 and 6. Each expansion device 15 is arranged in an axially running slot 16 in the periphery of rotor core 1 and may comprise a pressure tube for receiving a polymerizing pressure medium 15'. Such a device is described in U.S. Pat. No. 3,952,406. Each slot 16 is provided at one end with a relatively short, curved channel 17 which encloses a thin filling tube 18 for an expansion tube belonging to the device 15. The end surface of the rotor pole in FIG. 5 is designated 1a.

Other expansion devices may also be used to prestress casing 11, in lieu of device 15. In one alternative device there is casing 11 which is provided with a lining of sheet metal, for example soft sheet steel, which is welded to either end of the casing by means of a pressure-tight annular seam. Through a hole in the wall of the casing thermosetting resin is pumped into the gap between the lining and the casing and is cured under a pressure of at least 100 bar. It is also possible to prestress casing 11 without building in the metallic parts of the expansion device. This can be done by first attaching spacing pieces 9 and shaft ends 7 to a previously wound rotor body having its casing 11 installed. Then, thermosetting resin is pumped in through an inlet channel normally used for cooling liquid, at a pressure of at least 100 bar, to fill the gap between rotor core 1 and casing 11 with resin. When the resin has solidified, components 7 and 9 are detached and holes are bored through the hollow conductor walls of winding portions lying axially outside the end surfaces of rotor core 1. Spacing pieces 9 and shaft ends 7 are bored up or cleaned in some other way, for example by withdrawing strings placed therein, to remove resin residue.

In the embodiments of the invention shown in the drawings, lubricating oil is used as coolant. The oil is supplied with a pressure of 6 bar to a bearing 19 which surrounds the shaft end 7 and then flows through radial channels 20 into an axial shaft end channel 21 which aligns with an axial channel 22 in the non-magnetic spacing piece 9. Channel 22 and the adjacent electrically insulating layer 9', form a distributing chamber 23 from which a plurality of axially directed, bored holes 24 (shown in phantom in FIG. 1) provide hydraulic connection with all hollow conductors 6 located at the ends of rotor core 1. Thus, oil flows through the axially directed portions of coil 4 and leaves the winding at the other end of the rotor. The oil exhausts into a collecting chamber of the same shape as the distributing chamber 23 and then through axial and radial channels in the shaft end, is brough into and through the second bearing and by way of an external conduit and a pump back to the first bearing. In one embodiment, the pump gives a pressure of 6 bar; the pressure drop across the rotor is 3 bar; and across the two bearings, 3 bar. In a machine according to the invention, in inflow or outflow of the coolant does not necessarily have to take place through a rotor bearing. Using the two bearings for this purpose is, however, advantageous since the fact that the rotor is direct-cooled by means of a liquid coolant has no increasing effect on the number of shaft seals in such a case.

Besides the cooling circuit for the winding described above, the rotor has a second, parallel cooling circuit designed for cooling the rotor casing 11 and the rotor end. At the transition between the axial channels 21 and 22 there is a circular gap 25 lying in a radial plane, said gap 25 communicating with an annular chamber 26 in spacing piece 9 through a number of holes 25' bored through the spacing piece. A number of axially directed cooling channels 27 emanate from chamber 26, as shown in FIG. 3. The end surface of the shaft end facing the spacing piece 9 has an annular flange 28, which is fitted into a corresponding annular slot in the spacing piece 9 with close tolerances. Since cooling liquid flows through the gap 25, a substantial temperature difference is avoided between the components located on either side of the gap 25, thus eliminating the risk of high mechanical tensions between flange elevation 28 and corresponding slots.

The magnetic core shown in FIG. 4 is manufactured from one single forging. The threaded holes 29 are intended for the bolts 8, which, together with similar bolts at the rotor end which is not shown, provide the required mechanical connection between rotor core and shaft ends. A reinforcement of this connection is attained by arranging a stay 30 (FIG. 3), which is threaded at the ends and provided with a nut (not shown), in an axial hole made for this purpose in each of the two filling bodies 14. Stay 30 is then tensioned between the flanges of the two shaft ends 7.

In the embodiment of the invention shown in FIG. 7, the iron core of the rotor is surrounded by a cylindrical casing 31. Since casing 31 is of non-magnetic material, it can be connected mechanically to a pair of steel shaft end 32 without this causing any increase in the leakage flow. At least one shaft end 32 of the rotor has a diameter which exceeds the external diameter of the casing, and is provided with an axially inwardly facing circular slot 33, in one wall of which there is located a sealing ring 34 abutting the inner side of the casing. A spacing piece 35 arranged between the shaft end and the iron core is made of non-magnetic material. The casing 31 is formed with axial projections in the form of threaded bolts 36, providing a mechanical connection between the shaft end 32 and the casing 31. This makes the rotor more rigid and less deflected during operation. The shaft end 32 is provided with two axial channels 37 which contain conductors connecting the rotor winding to a current source, not shown. The invention also comprises the case where one of the two cylindrical walls of the slots 33 and 10 is very small or insignificant. In the rotor shown in FIG. 7 the radially outer wall of the slot 33 may in some cases be dispensed with because of the bolts 36. However, it is always advantageous to retain this wall since it makes sure that the distance of the casing from the slot wall provided with a sealing ring at no place exceeds a certain allowed maximum value.

Having described my invention in sufficient detail to enable one skilled in the art to make and use it, I claim:

1. A rotor for a bi-polar turbo-generator, comprising:
a core of magnetic material having a rotational axis;
at least one winding on said core, said winding having a plurality of turns of hollow conductor, said turns having axial portions oriented substantially parallel to said axis and a pair of end portions oriented substantially transverse to said axis;
a pair of shaft ends disposed axially outside said end portions and flanged to opposite ends of said core, each of said shaft ends having an integral shaft end flange;
a pair of spacing pieces of non-magnetic material, each of said spacing pieces being disposed between the core and one of said shaft end flanges;
means for securing each of said spacing pieces to an adjacent end flange;
means located at one of said spacing pieces and cooperating with one of said shaft ends for conveying coolant into said turns of hollow conductor at one of said end portions;
means located at one of said spacing pieces and cooperating with the other of said shaft ends for conveying coolant from said turns of hollow conductor at the opposite one of said end portions;

a cylindrical casing surrounding said core to exert a pressure against the air gap surface thereof; and means for securing said cylindrical casing in pressure tight relationship to said spacing pieces.

2. A rotor according to claim 1, wherein said means for securing comprise an annular slot in each of said spacing pieces, each slot facing said core, said cylindrical casing being received at each end in one of said annular slots.

3. A rotor according to claim 2, wherein each of said slots is provided with at least one sealing ring of resilient material recessed in a slot wall.

4. A rotor according to claim 1, wherein each of said shaft ends includes a bearing, and said means for conveying coolant into said turns comprises:

first oil channel means leading from said one bearing through its associated shaft and;

an oil distributing space defined between said shaft and said core and connected to said oil channel means, said space communicating with said turns through a plurality of axially directed holes bored in said turns at said one end portion.

5. A rotor according to claim 4, wherein said means for conveying coolant from said turns comprises:

an oil receiving space defined between the other shaft end and said core, said receiving space communicating with said turns through a further plurality of axially directed holes bored in said turns at said other end portion;

second oil channel means leading from said oil receiving space to the other bearing on said other shaft end.

6. A rotor according to claim 1, wherein said core is provided with a plurality of axially directed cooling channels connected in parallel with said means for conveying coolant into and from said turns.

7. A rotor according to claim 4, wherein said core is provided with a plurality of axially directed cooling channels connected in parallel with said means for conveying coolant into and from said turns.

8. A rotor according to claim 6, wherein said axially directed cooling channels are limited in radial direction by the inner surface of said cylindrical casing.

9. A rotor according to claim 1 further comprising at least one non-magnetic filling body located between said axial portions of said turns and said cylindrical casing, said filling body having a plurality of axially directed cooling channels connected in parallel with said means for conveying coolant into and from said turns, said cooling channels being limited in radial direction by the inner surface of said cylindrical casing.

10. A rotor according to claim 1, wherein said cylindrical casing is prestressed to exert said pressure during operation, said pressure being evenly distributed along said core in the axial direction.

11. A rotor according to claim 10, wherein said cylindrical casing is spaced from said core by a body of pressurized, thermosetting resin, arranged between said core and said casing.

12. A rotor according to claim 10, wherein said cylindrical casing is spaced from said core by a plurality of axially directed metal tubes filled with a pressurized, themosetting plastic.

13. A rotor for a bi-polar turbo-generator, comprising:

a core of magnetic material having a rotational axis;

at least one winding on said core, said winding having a plurality of turns of hollow conductor, said turns having axial portions oriented substantially parallel to said axis and a pair of end portions oriented substantially transverse to said axis;

a pair of shaft ends disposed axially outside said end portions and flanged to opposite ends of said core, each of said shaft ends having an integral shaft end flange;

a pair of spacing pieces of non-magnetic material, each of said spacing pieces being disposed between the core and one of said shaft end flanges;

means located at one of said spacing pieces and cooperating with one of said shaft ends for conveying coolant into said turns of hollow conductor at one of said end portions;

means located at one of said spacing pieces and cooperating with the other of said shaft ends for conveying coolant from said turns of hollow conductor at the opposite one of said end portions;

a cylindrical casing surrounding said core to exert a pressure against the air gap surface thereof; and a tightening surface formed in each of said shaft end flanges facing the inside of said cylindrical casing for securing said cylindrical casing in pressure tight relationship to said shaft end flanges.

14. A rotor according to claim 13, wherein at least one of said shaft end flanges is provided with a sealing ring of resilient material recessed in said tightening surface.

15. A rotor according to claim 13, wherein said means for securing comprises an annular slot in each of said spacing pieces, each slot facing said core, said cylindrical casing being received at each end in one of said annular slots.

16. A rotor according to claim 15, wherein each of said slots is provided with at least one sealing ring of resilient material recessed in a slot wall.

17. A rotor according to claim 13, wherein each of said shaft ends includes a bearing, and said means for conveying coolant into said turns comprises:

first oil channel means leading from said one bearing through its associated shaft and;

an oil distributing space defined between said shaft and said core and connected to said oil channel means, said space communicating with said turns through a plurality of axially directed holes bored in said turns at said one end portion.

18. A rotor according to claim 17, wherein said means for conveying coolant from said turns comprises:

an oil receiving space defined between the other shaft end and said core, said receiving space communicating with said turns through a further plurality of axially directed holes bored in said turns at said other end portion;

second oil channel means leading from said oil receiving space to the other bearing on said other shaft end.

19. A rotor according to claim 13, wherein said core is provided with a plurality of axially directed cooling channels connected in parallel with said means for conveying coolant into and from said turns.

20. A rotor according to claim 17, wherein said core is provided with a plurality of axially directed cooling channels connected in parallel with said means for conveying coolant into and from said turns.

21. A rotor according to claim 19, wherein said axially directed cooling channels are limited in radial direction by the inner surface of said cylindrical casing.

22. A rotor according to claim 13 further comprising at least one non-magnetic filling body located between said axial portions of said turns and said cylindrical casing, said filling body having a plurality of axially directed cooling channels connected in parallel with said means for conveying coolant into and from said turns, said cooling channels being limited in radial direction by the inner surface of said cylindrical casing.

23. A rotor according to claim 13, wherein said cylindrical casing is prestressed to exert said pressure during operation, said pressure being evenly distributed along said core in the axial direction.

24. A rotor according to claim 23, wherein said cylindrical casing is spaced from said core by a body of pressurized, thermosetting resin, arranged between said core and said casing.

25. A rotor according to claim 23, wherein said cylindrical casing is spaced from said core by a plurality of axially directed metal tubes filled with a pressurized, thermosetting plastic.

* * * * *